ary. In the preparation
United States Patent Office 2,963,370
Patented Dec. 6, 1960

2,963,370

MANUFACTURE OF CHEESE

Zola D. Roundy, Clarendon Hills, Ill., assignor to Armour and Company, Chicago, Ill., a corporation of Illinois No Drawing. Filed Dec. 3, 1957, Ser. No. 700,278

10 Claims. (Cl. 99—116)

This invention relates to the manufacture of soft-type cheeses. It relates particularly to the manufacture of soft-type cheeses, such as Neufchatel, Baker's and Philadelphia cream type cheeses, by a rapid process which may also be utilized as a continuous process.

It has long been an object of the cheese industry to develop rapid methods of cheese manufacture. That the efforts in this direction have been relatively unsuccessful is illustrated by a brief survey of the current methods. Typical modern processes are much the same as those brought to this country from the Swiss province of Neufchatel. In such processes milk or milk and cream mixtures are adjusted to the desired fat content, then inoculated with a starter culture of an acid forming microorganism, usually a mixture of the species *S. lactis* and either *Leuconostoc citrovorus* or *Leuconostoc paracitrovorus,* and the inoculated mixture is then allowed to ferment for about 16 to 18 hours. Rennet is commonly added to promote the formation of a larger curd. At the conclusion of the fermentation period, the curd is drained through unbleached muslin. Much difficulty is often encountered in controlling the conditions of fermentation so that a curd of desirable size and texture is formed. Conventional procedures are also deficient in that the curd produced thereby has a tendency to "weep" or leak whey when held in storage.

The old processes are time consuming in at least two distinct operations, the first being the time required for the development of sufficient acidity by the fermentation processes, and the second being the period required to separate the curd and whey by drainage through unbleached muslin.

The fermentation process, which involves the growth and nurture of a starter culture of lactobacillus, is usually complicated by the concomitant growth and development of undesirable organism and materials, such as, for instance, the gas forming bacteria, bacteriophages, antibiotics, etc. The fermentation process requires the preservation and nurture of a pure starter culture; this is a most sensitive and critical microbiological process in itself.

The separation of curd and whey produced by fermentation processes has always been inhibited by the nature of the curd precipitate formed since that precipitate often encloses whey within the curd.

It is accordingly an object of the present invention to provide a rapid process for the manufacture of soft-type cheeses. It is a particular object to provide an acid precipitation process for the manufacture of soft-type cheeses. It is another object of the invention to provide a method wherein the fermentation processes and accompanying use of starter cultures and rennet is eliminated. It is another particular object of the invention to provide a process wherein a curd is produced which is amenable to separation by centrifugation with prior heat treatment. It is also an object to provide a method of producing a curd which has little or no tendency to "weep" or leak whey when held in storage. Further objects and advantages of the invention will appear as the specification proceeds.

In the practice of the process of this invention it is customary, but not essential, to adjust the fat content of the milk or cream and milk mixture. In the preparation of Baker's cheese, the milk mixture generally contains either no fat or merely a trace of fat. In the production of Neufchatel-type cheese the milk and cream mixture is adjusted to contain approximately 5 to 8% fat. In the production of cream cheeses the milk and cream mixture in the ordinary case may contain from 7 to 20% fat.

In the process of the invention it is customary and desirable to pasteurize the milk mixture in the preparation of soft-type cheeses to improve its flavor and keeping qualities. Since this process requires only a short period of time, pasteurization is not usually essential since insufficient time is allowed for undesirable organisms to develop.

It has been found to be desirable to homogenize the milk and cream mixtures in the production of all cream cheeses. It has heretofore been considered essential that the milk mixture be homogenized in the preparation of cream cheeses, however in the present acid precipitation process, although it is desirable, it is not essential that the milk and cream mixture be homogenized. Homogenization will generally reduce the loss of fat in the whey and aid in the production of curd with a uniform fat content.

Instead of using rennet or starter culture I have found it desirable to acidify the milk and cream mixture to about its isoelectric point, that is to a pH of about 4.6 to 4.7 while at a temperature within the range of from about 50° F. to 120° F. This acidification is accomplished by the addition of about .3 to .4% by weight of an edible acid dissolved in water. In this step any edible acid, such as citric acid, phosphoric acid, acetic acid, lactic acid, gluconic acid, etc., or any mixture of such acids, may be used. It has been found desirable in the process to heat the water in which the edible acid is to be dissolved. In the preparation of Baker's cheese it has also been found desirable to acidify the mixture to a point slightly beyond the isoelectric point or to about a pH of 4.5. The precipitation of the curd is accomplished in a very short time, as soon as the mixture is completely acidified. To accomplish uniform acidification it has been found desirable to agitate the milk and cream mixture during the addition of the aqueous solution of acid. The preferred temperature for the acidification step is from about 80 to 95° F.

The curd and whey may be separated according to the conventional procedures of drainage through unbleached muslin. However, it has been discovered that when precipitated by the method described in this invention the curd and whey may be separated by means of mechanical devices, that is by means of centrifuge without further treatment. This is a surprising discovery in that it has always been required to heat the curd prior to centrifuging in order to make possible the use of a centrifuge. In the prior art it was thought necessary in order to prepare a curd and whey mixture for centrifuging that the mixture be heated to in excess of about 130° F.; such a process is described in U.S. Patent No. 2,387,276. However, in the present process the acid precipitated curd is of such a nature that it can be centrifuged immediately after its being precipitated without any heat treatment whatsoever. The process therefore is simply adapted to continuous operation since the milk and cream mixture may be acidified continuously and curd and whey may be separated continuously.

Following the separation of the curd, the curd may be flavored as by the addition of salt, pimento, diacetyl, garlic, etc. or any of the common cheese flavorings.

The invention as described above may be further illustrated by the following specific examples:

Example I

In the preparation of a pasteurized process cheese, three cans of whole milk weighing about 250 pounds were placed in each of two vats. The butterfat content of the milk was adjusted to contain from 3.8 to 4.0% of butterfat. The temperature of the milk was raised to 86° F. Approximately 1 pound of citric acid was dissolved in water at a temperature of approximately 130° F. The citric acid solution was then added with agitation to precipitate the casein of each lot of milk. After the acidified milk was heated to approximately 125° F. the whey was removed by filtration through unbleached muslin. It was found that the curd obtained by this process was easily and rapidly filtered and was greatly superior to that produced by fermentation processes particularly in that it had little or no tendency for syneresis.

By analysis it was found that the precipitated curd tested 25% fat and 50.87% moisture. Approximately 1 pound of curd was obtained from 7½ pounds of milk.

Example II

In revising the procedures of Example I to provide a continuous process, a curd is first precipitated by the continuous mixture of milk and acid solution in the proportions and under the conditions specified in Example I. The precipitated curd and whey is then piped directly to a mechanical centrifugal separator. The curd is easily and completely separated from the whey by mechanical means without the necessity of prior heat treatment.

Example III

Baker's type cheese and Neufchatel type cheese were prepared by the acid precipitation method by acidifying skim milk and whole milk respectively to approximately pH 4.7 with citric acid in water previously heated to approximately 140° F. The acid was added after the milks had been heated to a temperature of from 84 to 86° F. As soon as the casein was precipitated, the whey was removed by filtration through unbleached muslin. After the whey was removed, the curds were pressed lightly and then mixed with aged cheese and water in such proportions as to give a spread testing 8% fat and 75% moisture. The spread was made to contain 0.5% disodium phosphate and 0.5% sodium citrate. These salts, although not absolutely necessary, assist in the emulsification of the soft-type cheese spread. Approximately 0.7% salt was added to suit the taste. The mix was then heated under gentle agitation in a water bath to a temperature of approximately 140° F. and subsequently passed through a colloid mill. After the mix had passed through the colloid mill, it was sterilized at 243° F. for 30 minutes.

The sterile cheese spread produced as specified above was found to have a very smooth consistency and satisfactory flavor immediately after sterilization and again after 4 months of holding at room temperature. Thus, it is seen that the acid precipitation method is very satisfactory in the preparation of sterile cheese foods.

Example IV

In a continuous process for the preparation of cheese a curd prepared as specified above in Example III from either skim milk or whole milk is continuously precipitated in the proportions and under the conditions specified in Example III by the continuous mixing of milk and an edible acid solution. Following precipitation, the curd and whey mixture is then passed to a mechanical separator where it is separated by a conventional centrifugation process. The curd is amenable to separation and does not require heat treatment prior to separation. The separated curd may then be used in conventional cheese preparations.

Example V

A dehydrated Neufchatel type cheese was made in the following manner:

Thirty pounds of whole milk was placed in a can and warmed to 86° F. Citric acid in water at a temperature of 120° F. was added to reduce the pH of the milk to approximately 4.7. After the casein was precipitated the whey was removed by filtration through unbleached muslin. Mild pressure was then applied to the curd to remove the free whey, after which the curd was mixed with approximately an equal weight of water containing a small amount of sodium citrate and disodium phosphate (0.5% of each). The mixture was warmed in a water bath to a temperature of approximately 120° F. and passed through a colloid mill and then spray dried.

The dehydrated product had the following composition:

|  | Percent |
|---|---|
| Ash (Ca=0.05) | 2.2 |
| Carbohydrates | 5.7 |
| Protein | 38.3 |
| Moisture | 3.2 |
| Fat | 50.6 |

The dehydrated Neufchatel type cheese was used in the preparation of cheese cakes and was found to be of very satisfactory quality and characteristics.

Example VI

Four thousand cubic centimeters of cream testing 15% butterfat was placed in each of two stainless steel containers and warmed to 130° F. in a water bath. To the cream in one of the containers was added 0.2% of a 30% solution of hydrogen peroxide diluted in an equal weight of cold water. The peroxide was added slowly and permitted to act upon the cream at 130° F. for a period of 10 minutes. It was then destroyed by catalases which was added after the cream was cooled to a temperature of 90° F. A control lot was treated in similar fashion except that it was not treated with hydrogen peroxide and catalase.

After the peroxide was decomposed, 0.35% of citric acid based on the weight of the cream, was added to each of the two lots to precipitate the casein. As soon as the casein was precipitated, the acidified creams were heated to 117° F., after which the whey was removed by filtration. When the drainage of the whey was completed the resulting curds were pressed and salted.

The cheeses produced from both the treated and nontreated creams were exceptionally smooth and possessed a pleasing, mild-acid flavor. They did not "weep" or loose whey in storage.

The yields of cheese from the two lots of cream were approximately the same, that is 1400 grams of cheese from 4000 cubic centimeters of 15% cream.

In a similar preparation the separation of the curd and whey is readily accomplished by mechanical means. The step of heating the curd and whey to about 117° F. is unnecessary to accomplish the separation of curd and whey and the curd and whey may therefore be passed directly to the separator after precipitation.

It will be understood from the foregoing specification and examples that the invention described and claimed herein is susceptible of many variations and modifications, and that all such modifications are within the spirit and scope of the invention and the claims thereto.

I claim:

1. A continuous process for the manufacture of dehydrated cheese of the soft-cream type comprising the steps of acidifying a mixture of milk and cream to about the isoelectric point of said mixture with an edible acid whereby curd is immediately precipitated from said mixture, separating said curd from the whey without heat treatment by a process of centrifugation, diluting the curd with water, passing the solution of curd and water through a colloid mill to reduce the particle size of the curd, and removing moisture from the solution of water and curd by spray drying whereby a powdered cheese product is obtained.

2. A process for the manufacture of soft-type cheeses comprising the steps of acidifying a lacteal material before the formation of curd therein with an aqueous solution of an edible acid having a temperature greater than that of the lacteal material to thereby form a cheese curd and whey, and mechanically separating said curd from the whey.

3. A process for the manufacture of cream type cheeses comprising the steps of acidifying a lacteal material before the formation of curd therein and containing 7 to 20% fat with an aqueous solution of an edible acid having a temperature greater than that of the lacteal material to thereby form a cheese curd and whey, and mechanically separating said curd from the whey.

4. A process for the manufacture of soft-type cheeses comprising the steps of acidifying a lacteal material before the formation of curd therein with an aqueous solution of an edible acid having a temperature in the order of 120–140° F. to thereby form a cheese curd and whey, and mechanically separating said curd from the whey.

5. A process for manufacturing soft-type cheese comprising the steps of acidifying whole milk with an aqueous solution of an edible acid having a higher temperature than that of the whole milk to thereby precipitate a cheese curd and whey, and mechanically separating said curd from the whey.

6. A process for the manufacture of Neufchatel type cheeses comprising the steps of acidifying a lacteal material before the formation of curd therein and of from 5 to 8% fat by means of an aqueous solution of an edible acid having a temperature greater than that of the lacteal material to thereby form a Neufchatel-type cheese curd and whey, and mechanically separating said curd from the whey.

7. A process for manufacturing soft-type cheeses comprising the steps of acidifying a lacteal material before the formation of curd therein by means of an aqueous solution of citric acid having a temperature greater than that of the lacteal material to thereby form a cheese curd and whey, and mechanically separating such curd from the whey.

8. A process for manufacturing soft-type cheeses comprising the steps of acidifying whole milk with an aqueous solution of citric acid having a temperature on the order of 120 to 140° F. to thereby form a cheese curd and whey, and separating said curd from the whey.

9. A process for the manufacture of Neufchatel-type cheeses comprising the steps of acidifying a lacteal material before the formation of curd therein and containing 5 to 8% fat by means of an aqueous solution of citric acid having a temperature on the order of 120 to 140° F. to thereby form a Neufchatel-type cheese curd and whey, and separating said curd from the whey.

10. A process for manufacturing soft cream-type cheese comprising the steps of acidifying a lacteal material before the formation of curd therein containing from 7 to 20% fat with an aqueous solution of citric acid having a temperature in the order of 120 to 140° F. to thereby form a cream-type cheese curd and whey, and separating said curd from the whey.

References Cited in the file of this patent

UNITED STATES PATENTS

| | | |
|---|---|---|
| 2,006,700 | Supplee et al. | July 2, 1935 |
| 2,225,506 | Otting | Dec. 17, 1940 |
| 2,387,276 | Link | Oct. 23, 1945 |
| 2,558,256 | Killengreen | June 26, 1951 |
| 2,574,508 | Strezynski | Nov. 13, 1951 |
| 2,682,467 | Brereton et al. | June 29, 1954 |
| 2,701,202 | Silberman | Feb. 1, 1955 |
| 2,701,204 | Strezynski | Feb. 1, 1955 |
| 2,712,999 | Strezynski | June 12, 1955 |
| 2,743,186 | Kraft et al. | Apr. 24, 1956 |